April 27, 1965 R. W. WARREN 3,180,575

FLUID TIME GATE

Filed Jan. 16, 1963 3 Sheets-Sheet 1

INVENTOR,
RAYMOND W. WARREN

BY S. J. Rotondi, A. J. Dupont & J. P. Edgerton
ATTORNEYS

FLUID TIME GATE

Filed Jan. 16, 1963 3 Sheets-Sheet 2

INVENTOR,
RAYMOND W. WARREN

BY S. J. Rotondi, A. J. Dupont & J. P. Edgerton
ATTORNEYS

April 27, 1965 R. W. WARREN 3,180,575

FLUID TIME GATE

Filed Jan. 16, 1963 3 Sheets-Sheet 3

INVENTOR,
RAYMOND W. WARREN

BY S. J. Rotondi, A. T. Dupont
& J. D. Edgerton
ATTORNEYS

United States Patent Office 3,180,575

Patented Apr. 27, 1965

3,180,575

FLUID TIME GATE

Raymond W. Warren, McLean, Va., assignor to the United States of America as represented by the Secretary of the Army Filed Jan. 16, 1963, Ser. No. 251,987

12 Claims. (Cl. 235—201)

Figure 1:
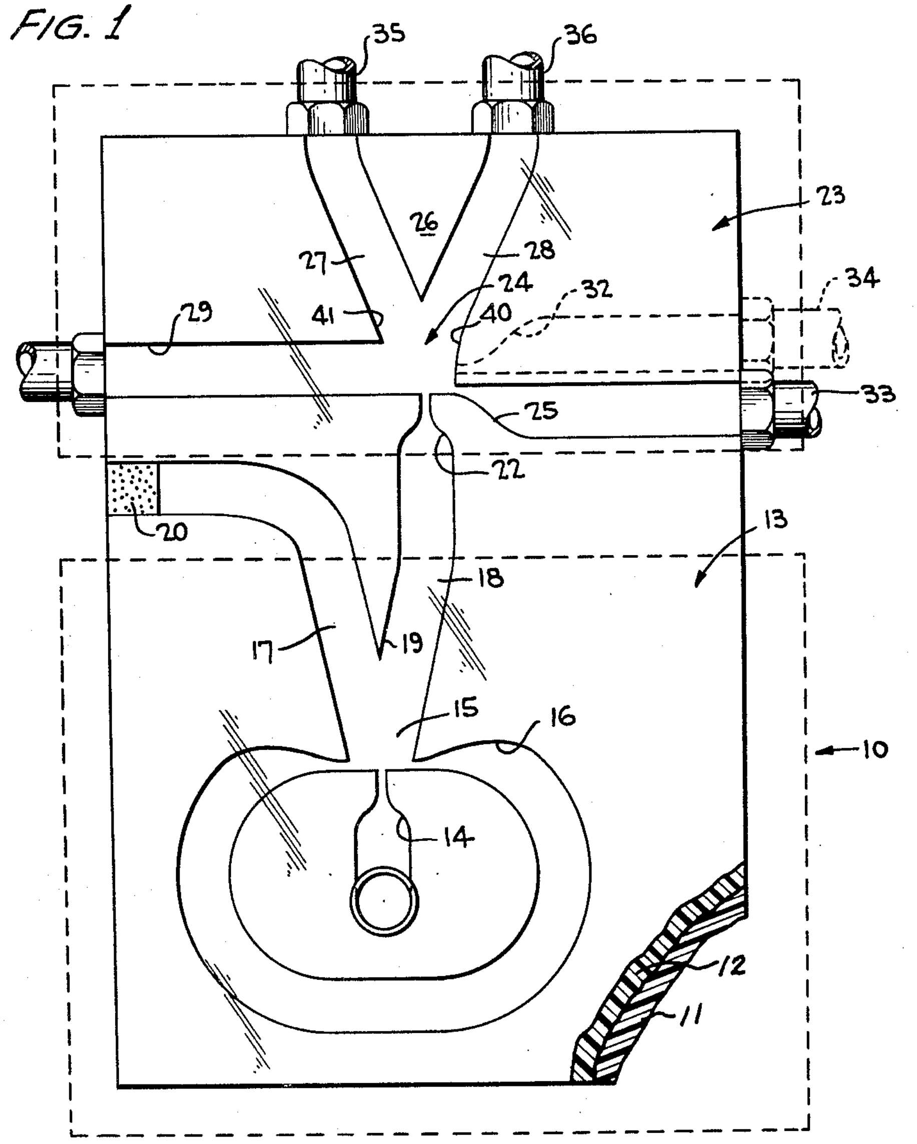

(Granted under Title 35, U.S. Code (1952), sec. 266)

The invention described herein may be manufactured and used by or for the Government for governmental purposes without the payment to me of any royalty thereon.

This invention relates generally to pure fluid amplifying systems and more specifically to a pure fluid time gate capable of gating fluid input signals without the use of moving mechanical parts.

Existing electronic logic and computing systems are capable of performing the basic arithmetic functions of addition, subtraction, multiplication and division. Such electronic systems typically include circuits that are capable of producing an output signal which is a prescribed function of one or more input signals and normally employ the binary system of number notation because of the ease of recognition and handling of the quantities employed. Specifically, the binary number system utilizes only two number designations 1 and 0; the 1 normally being represented by a voltage pulse and the 0 normally being represented by the absence of a voltage. By causing the voltage pulse, representing a binary 1, to be substantially greater (for instance, 2 volts) than the quiescent voltage level of the system, which represents a binary 0, the circuits of the system may be made to readily distinguish between the two signals generated in the system.

Electronic data handling systems utilizing the binary systems of notation normally employ four basic circuit elements: "and," "or-nor" (also known simply as "or"), "not" logic elements plus flip-flops, or alternatively, the "and" and "or-nor" logical elements used in combination with inverters and flip flops.

In electronic binary systems an AND function signifies a type of circuit whereby the output signal has a value of 1 only when input data signals are applied to all of the input circuits of the element.

An OR component serves to indicate that the output value is 1 if any or all of the input data signals have a value of 1. The NOR function of an OR-NOR component refers to the situation or state wherein neither input signal has a value of 1 so that the value of the output is 0, or alternatively, the inverted output signal has a value of 1.

Electronic computers can, of course, speedily perform all types of logic functions. However, in many applications of data handling, high speeds of operation are not required and therefore the high cost of an electronic system is not warranted. While mechanical systems employing liquids and gases have been developed which will perform logic functions essentially analogous to those performed by existing electronic logic elements, such systems require large numbers of moving parts. Moving mechanical parts produce operating limitations because of friction thermal expansion and wear. Also, mechanical systems are limited in some applications because the weight and inertia of the moving parts impart inherently long response times to such systems and consequently reduce the computing speed below that desired even for relatively low speed systems.

In joining logic components to provide adders, subtractors, multipliers and dividers in any kind of a computer, it is often necessary to cascade and otherwise combine the various logic components. When the signal passes through a series of such components, however, there are power losses, causing the amplitude of the output signal to decrease. Thus, in an electronic computer, voltage and current amplification is required in order to perform complex operations.

Similarly, in fluid systems, energy losses resulting from skin effects and stream turbulence reduce the magnitude of the output signal and therefore some mechanism for providing a signal gain should preferably be incorporated in the system. Achieving a signal gain in a fluid computer has hitherto required moving parts; however, as mentioned above, such parts cause these computers to have relatively slow response times. Thus, there exists a need in the fluid computer art for achieving a signal or power gain without moving parts so that the fluid computer elements may be stacked into complex arrangements and combinations and yet operate with relatively fast response times.

It was discovered recently that a fluid-operated system having no moving parts could be constructed so as to provide a fluid amplifier in which the proportion of the total energy of a fluid stream delivered to an output orifice or utilization device is controlled by a further fluid stream of lesser total energy. These systems are generally referred to as "pure fluid amplifiers," since no moving mechanical parts are required for their operation.

A typical pure fluid amplifier may comprise a main fluid nozzle extending through an end wall of an interaction region defined by a sandwich-type structure consisting of an upper plate and a lower plate which serve to confine fluid flow to a planar flow pattern between the two plates, an end wall, two side walls (hereinafter referred to as the left and right side walls), and one or more dividers disposed at a predetermined distance from the end wall. The leading edges or surfaces of the dividers are disposed relative to the main fluid nozzle centerline so as to define separate areas in a target plane. The side walls of the dividers in conjunction with the interaction region side walls establish the receiving apertures which are entrances to the amplifier output channels. Completing the description of the apparatus, left and right control orifices may extend through the left and right side walls respectively. In the complete unit, the region bounded by top and bottom plates, side walls, the end wall, receiving apertures, dividers, control orifices and a main fluid nozzle, is termed as "interaction chamber region."

Two broad classes of pure fluid amplifiers are—I, stream interaction or momentum exchange and II, boundary layer control. Class I amplifiers include devices, in distinction to the devices of class II, in which there are two or more streams which interact in such a way that one or more of these streams (control streams) deflects another stream (power stream) with little or no interaction between the side walls of the interaction region and the streams themselves. Power stream deflection in such a unit is continuously variable in accordance with control signal amplitude. Such a unit is referred to as a continuously variable amplifier or computer element. In an amplifier or computer element of this type the detailed contours of the side walls of the interaction chamber are of secondary importance to the interacting forces between the streams themselves. Although the side walls of such units can be used to contain fluid in the interacting chamber, and thus make it possible to have the control and power streams interact in a region at some desired ambient pressure, the side walls are so placed that they are somewhat remote from the high velocity portions of the interacting streams and the power stream does not approach or attach to the side walls. Under these conditions the power stream flow pattern within the interacting chamber depends primarily upon the size, speed and direction of the power stream and control streams and upon the density, viscosity, compressibility and other properties of the fluids in these streams.

(II) The second broad class of fluid amplifier and computer elements comprises units in which the main power stream flow and the surrounding fluid interact in such a way with the interaction region side walls that the resulting flow patterns and pressure distributions within the interaction region are greatly affected by the details of the design of the chamber walls. In this broad class of units, the power stream may approach or may contact the interaction region side walls. The effect of the side wall configuration on the flow patterns and pressure distribution, which can be achieved with single or multiple streams, depends upon the relation between: the width of the interacting chamber near the power nozzle, the width of the power nozzle, the position of the center line of the power nozzle relative to the side walls (symmetrical or asymmetrical), the angles that the side walls make with respect to the center line of the power nozzle; the length of the side walls or their effective length as established by the spacing between the power nozzle exit and the flow dividers, side wall contour and slope distribution; and the density, viscosity, compressibility and uniformity of the fluids used in the interaction region. It also depends on the aspect ratio and therefore to some extent on the thickness of the amplifying or computing element in the case of two-dimensional units. The interrelationship between the above parameters is quite complex and is described subsequently. Response time characteristics are a function of size of the units in the case of similar units.

Amplifying and computing devices of this second broad category which utilize boundary layer effects; i.e., effects which depend upon details of side wall configuration and placement, can be further subdivided into three sub-types;

(*a*) Boundary layer units in which there is no "lock on" effect.

(*b*) Boundary layer units in which "lock on" effects are appreciable.

(*c*) Boundary layer units in which "lock on" effects are dominate and which have memory.

(*a*) Boundary layer elements in which there is no "lock on" effect: Such a unit has a gain as a result of boundary layer effects. However, these effects do not dominate the control signal but instead combine with the control flows to provide a continuously variable output signal responsive to control signal amplitude. In these units the power stream remains diverted from its initial direction only if there is a continuing flow out of or into one or more of the control orifices.

(*b*) Boundary layer units in which "lock on" effects are appreciable: In these units, the boundary layer effects are sufficient to maintain the power stream in a particular deflected flow pattern through the action of the pressure distribution arising from asymmetrical boundary layer effects and require no additional streams, other than the power stream to maintain that flow pattern. Naturally in this type unit continuous application of a control signal can also be used to maintain a power stream flow pattern. Such flow patterns can be changed to a new stable flow pattern, however, either by supplying or removing fluid through one or more of the control orifices, or through a control signal introduced by altering the pressures at one or more of the output apertures, as for example by blocking of the output channel to which flow has been directed.

(*c*) Boundary layer control units which have "memory": i.e., wherein lock-on characteristics dominate control signals resulting from complete blockage of the outlet to which flow has been commanded.

In "memory" type boundary layer units, the flow pattern can be maintained through the action of the power stream alone without the use of any other stream or continuous application of a control signal. In these units, the flow pattern can be modified by supplying or removing fluid through one or more of the appropriate control orifices. However, certain parts of the power stream flow pattern, including 'lock-on" to a given side wall, are maintained even though the pressure distribution in the output channel to which flow is being delivered is modified, even to the extent of completely blocking this output channel.

The power stream deflection phenomena in boundary layer units is the result of a transverse pressure gradient due to a difference in the effective pressures which exist between the power stream and the opposite interaction region side walls; hence, the term Boundary Layer Control. In order to explain this effect, assume initially that the fluid stream is issuing from the main nozzle and is directed toward the apex of a centrally located divider. The fluid issuing from the nozzle, in passing through the chamber, entrains some of the surrounding fluid in the adjacent interaction regions and removes this fluid therefrom. If the fluid stream is slightly closer to, for instance, the left side wall than the right side wall, it is more effective in removing the fluid in the interaction region between the stream and the left wall than it is in removing fluid between the stream and the right wall since the former region is smaller. Therefore, the pressure in the left interaction region between the left side wall and power stream is lower than the pressure in the right interaction region and a differential pressure is set up across the power jet tending to deflect it towards the left side wall. As the stream is deflected further toward the left side wall, it becomes even more efficient in entraining fluid from the left interaction region and the effective pressure in this region is further reduced. In those units which exhibit "lock-on" features or characteristics, this feedback-type action is self-reinforcing and results in the fluid power stream being deflected toward the left wall and predominantly entering the left receiving aperture and outlet channel. The stream attaches to and is then directly deflected by the left side wall as the power stream effectively intersects the left side wall at a predetermined distance downstream from the outlet of the main orifice; this location being normally referred to as the "attachment location." This phenomena is referred to as a boundary layer lock-on. The operation of this type of apparatus may be completely symmetrical in that if the stream had initially been slightly deflected toward the right side wall rather than the left side wall, boundary layer lock-on would have occurred against the right side wall.

Control of these units can be effected by controlled flow of fluid into the boundary layer region from control orifices at such a rate that the pressure in the associated boundary layer region becomes greater than the pressure in the opposing boundary layer region located on the opposite side of the power stream and the stream is switched towards this opposite side of the unit.

Alternatively instead of having flow into the boundary layer region to control the unit, fluid may be withdrawn from this "opposite" control orifice to effect a similar control by lowering the pressure on this "opposite" side of the stream instead of raising the pressure on the first side. The control flow may be at such a rate and volume as to deflect the power stream partially by momentum interchange so that a combination of the two effects may be employed. However, it is not essential, and in many cases is undesirable, that the control flow have a momentum component transverse to the power stream when the control fluid issues from its control orifice.

Only a small amount of energy is required in the control signal fluid flow to alter the power jet path so that some or all of the power jet becomes intercepted by the load device or output passage. For a continuously applied control signal, the power gain of this system can be considered equal to the ratio of the change of power delivered by the amplifier to its output channel or load to the change of control signal power required to effect this associated change of power delivered to the output channel or load. Similarly, the pressure gain can be considered equal to ratio of the change of output pressure to the change of control pressure required to cause the change, or, the ratio of the change of output channel mass flow rate to the associate change of control signal mass flow rate required defines the mass flow rate gain.

It is apparent that this second broad class of pure fluid amplifiers and components and systems provide units which can be interconnected with other units (for example, either class I or II elements) so that the output signal of one unit can provide the control or power jet supply of a second unit.

The term "input signal" is defined as the fluid signal which is intentionally supplied to the fluid logic component for the purpose of instructing or commanding the component to provide a desired output signal. Preferably each input signal is of some pre-established relatively constant magnitude. The term "output signal" used herein is the fluid signal which is produced by the fluid logic component. The input and output signals can be in the form of time or spatial variations in pressure, density, flow velocity, mass flow rate, fluid composition, transport properties, or other thermodynamic properties of the input fluid individually or in combination thereof. The term "fluid" as used herein includes compressible as well as incompressible fluids, fluid mixtures and fluid combinations.

In general, fluid logic components are designed such that upon the receipt of appropriate combinations of input signals the state of the component changes from a "zero" state to a "one" state. The basic pure fluid logic components of which we are aware incorporate an interaction chamber, a pair of output passages for receiving flow from the chamber and at least two angularly disposed nozzles for issuing interacting fluid streams into the up-stream end of the chamber. The two nozzles can be regarded as the control and power nozzles, respectively, and the input signal is normally supplied to the control nozzle so that a relatively small magnitude input signal can effect amplified directional displacement of the planar power jet flowing from one end of the interaction chamber. One output passage, say, the right output passage, corresponds to the zero state of the component and the left output passage corresponds to the one state of the logic component, and the component undergoes a change of state whenever the output flow switches from the right passage to the left passage. During the absence of a control input signal, it is essential that the component be in the zero state and accordingly issue substantially all flow from the right passage. In addition, once the flow is displaced into the left passage by an input signal, some means must be provided to rapidly return the flow to the right passage whenever the input signal is no longer received. The methods by which the power jet is normally directed to the right output passage and returned to the right output passage upon termination of the input signal may include the following: asymmetrically positioning the flow splitter closer to the left side wall than the right side wall with respect to the orifice of the power nozzle and providing sufficient chamber wall setback from the power nozzle orifice so that boundary layer effects are non-existent; positioning the chamber side wall associated with the right passage closer to the power nozzle orifice than the side wall associated with the left passage so that the power jet tends to reattach itself to the former side wall whenever there is an absence of control flow, or more particularly, employing a unit one half of which is a class I amplifier and the other half of which is a class II amplifier; inclining the power nozzle towards the right output passage so that the power stream is directed into that passage in the absence of control input flow, using a fluid reset signal to return the stream to the right output passage whenever the aforesaid input signal is terminated, the stream being retained in the reset position by any of the above means; or combinations of these expedients.

Electronic computing systems ordinarily receive the information supplied thereto in the form of successive pulses of data bit information. The data bits, as they are commonly referred to are routed through the circuit elements of the computer to control the operation of, or to energize various elements forming any particular computer circuit.

The majority of computers are synchronized by timed (clock) pulses to insure that the output signals or pulses from one circuit in the computer are in the same, or in at least some predetermined phase relationship with the output signals from another circuit in the computer. Synchronization is necessary because it is likely that the time required for one group of data pulses to route through one computer circuit may be faster or slower than the time required for the same group of data bit pulses to route through another computer circuit which is interconnected to the one circuit during a corresponding time interval.

Electronic digital computers working on a synchronous basis may employ a logic circuit in combination with an oscillator to provide a time gate, the function of time gates being to synchronize signals from various interconnected circuits in the computer to the same or at least some predetermined time base as established by the oscillator. The oscillator provides a series of timed output pulses having the desired preciseness, and the logic circuit is connected to the oscillator circuit such that the output pulses from the circuit combination are logic signals synchronized to the time base of the computer. The synchronized signals from one or more logic components can then be applied to drive multivibrators or binary information storage devices.

One type of fluid oscillator which may be incorporated in the pure fluid time gate of this invention consists of a fluid amplifier and a feedback system in communication with the amplifier for feeding back energy to control the power stream in the amplifier. This type of oscillator, known and referred to hereinafter as a sonic oscillator, is disclosed in my U.S. Patent 3,016,066 and utilizes reflected shock or pressure waves traveling at the speed of sound to effect oscillating displacement of the power stream from one output passage to another output passage. This type of oscillator should be distinguished from a relaxation type oscillator which depends upon the filling and emptying of a fluid capacitor or inertance to provide the desired timing or phase relationship to the oscillating fluid output signal.

The frequency of a sonic oscillator varies with the length of the feedback path and the speed of sound. The speed of sound varies as $$C=K\frac{P}{\rho}$$

for perfect gases or $C=KRT$, where:

$R$=gas constant
$T$=temperature in degrees Kelvin
$C$=speed of sound (feet per second)
$K$=ratio of specific heats
$P$=pressure in pounds per square inch; and
$\rho$=density During the operation of a sonic oscillator, the value K varies between narrow limits and as P increases, $\rho$ increases. Consequently, the speed of sound for slight variations in pressure and temperature is relatively constant. The length of the feedback path can easily be lengthened or shortened to provide any desired frequency of oscillation within the physical limits of the system. A fluid amplifier is employed in the sonic oscillator and is preferably of the class II type.

A fluid oscillator of the relaxation type requires in addition to a fluid amplifier and a feedback system or loop, some means for storing fluid energy. Such oscillators may store fluid energy in two forms, as potential and kinetic energy. Potential energy is energy associated with a "fluid capacitance." The term "fluid capacitance" can be defined as that class of fluid energy storage means which stores fluid potential energy. In general the energy stored in a fluid capacitance increases as a result of introduction of additional fluid therein. Fluid capacitance may take one or more of the following forms: compression of the fluid to a greater density, change of thermodynamic state of the fluid, change of elevation of the fluid, change of fluid internal energy level, compression of a second fluid separated from the first fluid by a flexible wall, compression of a second fluid in contact with the first fluid, deformation of elastic walls which restrain the fluid, change of elevation of a weight supported by the fluid, and compression of bubbles or droplets of one fluid entrained in another.

Fluids in motion have a kinetic energy which represents a second form of stored energy. The method of storing energy in this form is to accelerate the fluid to a higher speed. "Fluid inertance" is a measure of the pressure required to accelerate a mass of a fluid in a passageway or tube and is normally associated with the fluid flow through a tube.

The rate of oscillation of this type of oscillator varies with the pressure due to the change in rate at which the capacitance or inertance fills and discharges. Although the sonic oscillator, discussed above, is preferred as a source for timed fluid pulses and is disclosed in detail in this application, oscillators of the relaxation type may also be used as a source of timed pulses, such oscillators for example, being disclosed in detail in a patent application entitled "Fluid Oscillator," Serial No. 21,062, filed April 8, 1960, by Billy M. Horton and Ronald E. Bowles, and in the March 14, 1960 edition of "Product Engineering." Also, any of the pure fluid oscillators disclosed in my copending patent application entitled "Negative Feedback Oscillator," Serial No. 215,472, filed August 7, 1962 now patent No. 3, 158,166 could be alternatively employed in the time gate of the instant invention.

According to the present invention, an output passage of a pure fluid oscillator of the sonic or relaxation type is coupled to the power nozzle of an AND or OR-NOR pure fluid logic component so as to provide a pure fluid time gate component. Since the pure fluid oscillator and the pure fluid logic component incorporate two pure fluid amplifiers two stage amplification of fluid signals received by pure fluid time gate is effected. In addition, since no moving mechanical parts are required for the operation of the pure fluid time gate the response time of the fluid component is relatively low.

Broadly, therefore, it is an object of this invention to provide a pure fluid time gate having no moving mechanical parts.

More specifically, it is an object of this invention to provide in combination, a pure fluid oscillator and a pure fluid logic component, the latter component being coupled to the timed, pulsed output of the oscillator so as to produce a time gated, binary output signal.

Another object of this invention is to provide a pure fluid time gate comprising a pure fluid oscillator and an AND pure fluid logic component, the output of the AND component being under the control of the oscillator so that time gated, binary fluid pulses issue from the logic component.

Still another object of this invention is to provide in combination, a pure fluid oscillator and an OR-NOR pure fluid logic component coupled to the output of the oscillator so as to produce a time gated, binary output signal.

Figure 3:
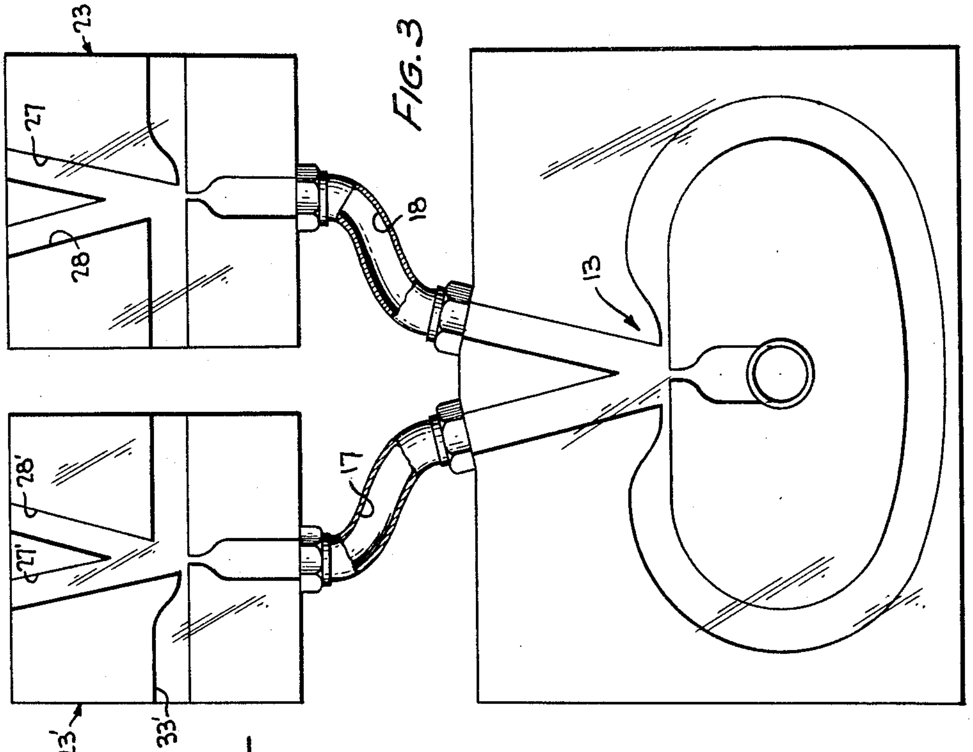
Figures 2A, 2B, 2C, 2D:
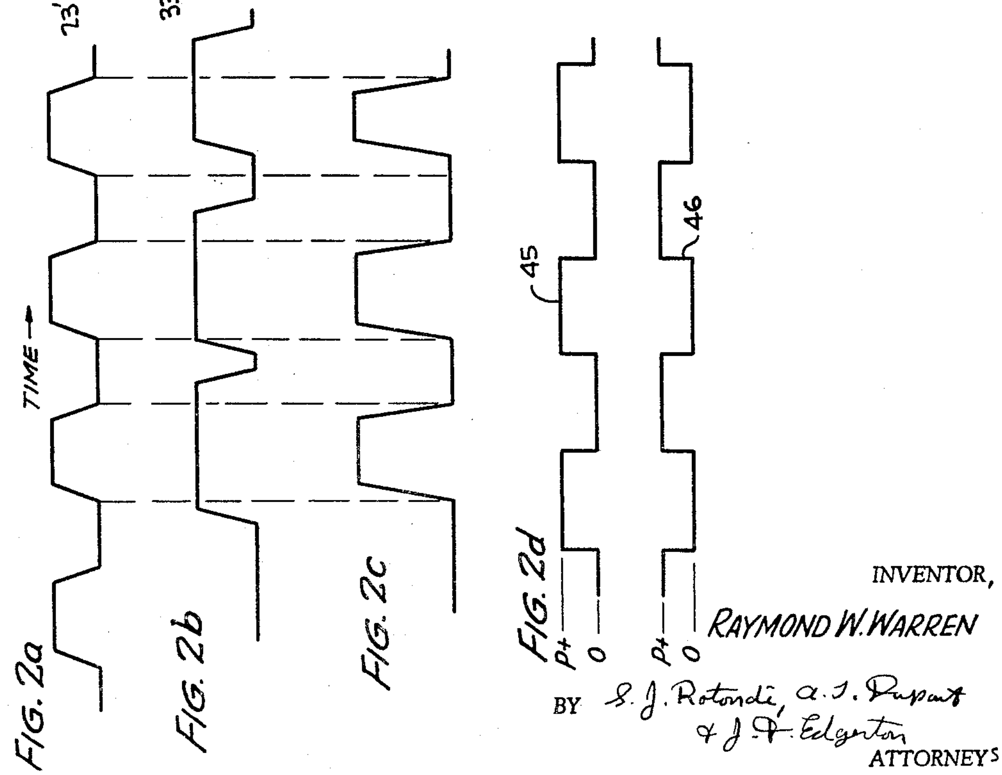
Figure 4:
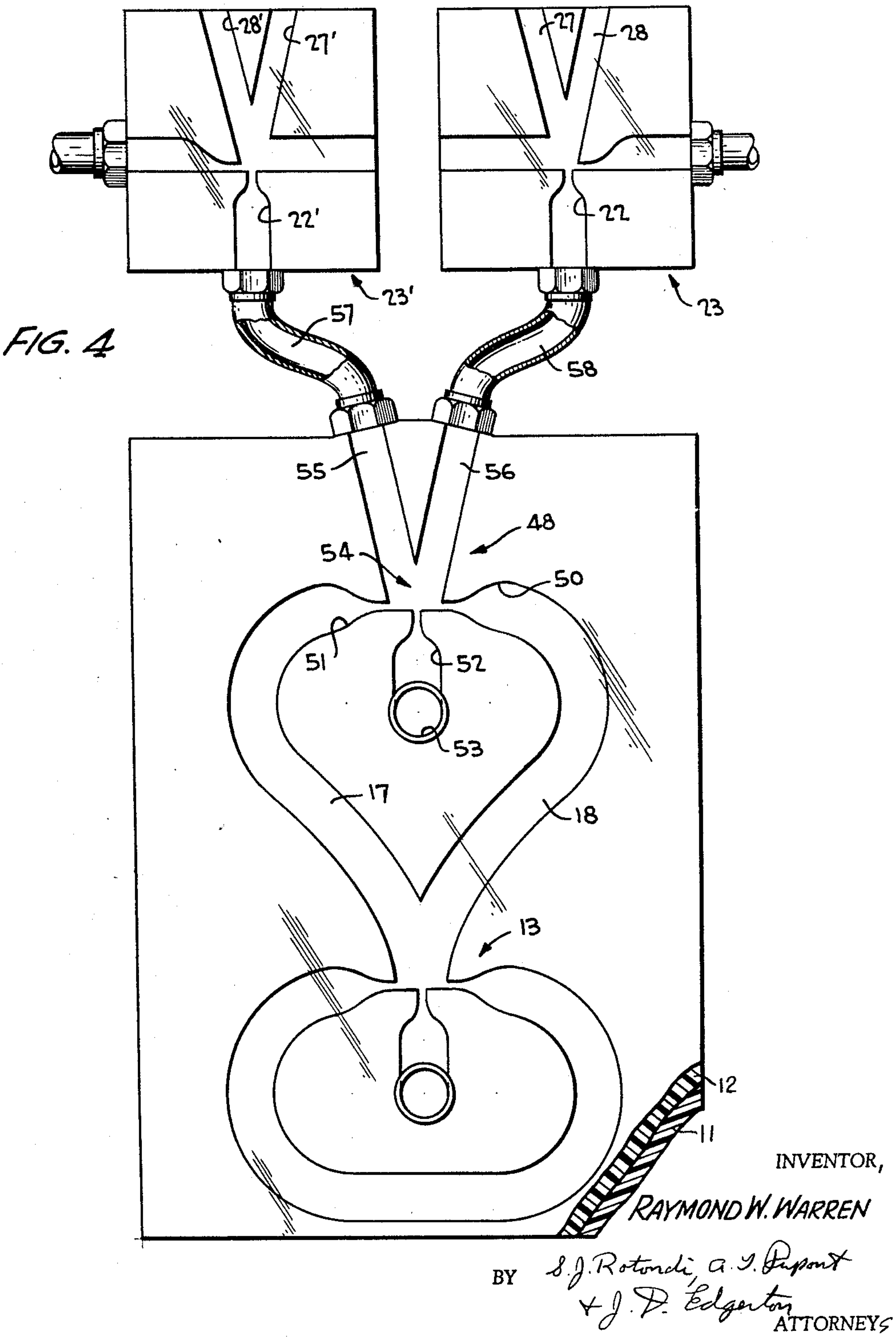

The above and still further objects, features and advantages of the present invention will become apparent upon consideration of the following detailed description of several specific embodiments thereof, especially when taken in conjunction with the accompanying drawings, wherein:

FIGURE 1 illustrates a plan view of a pure fluid time gate constructed in accordance with this invention;

FIGURE 2*a* illustrates the wave shape of a typical output fluid signal produced by a stream issuing from one output passage of a pure fluid oscillator employed in the pure fluid time gate of this invention;

FIGURE 2*b* illustrates the wave form of a typical pulsed input fluid signal supplied to a fluid logic component employed in the pure fluid time gate of this invention for interacting with the pulsed output shown in FIGURE 2*a*; and FIGURE 2*c* illustrates the resultant wave shape of time gated fluid output pulses produced by the pure fluid time gate of this invention;

FIGURE 2*d* illustrates typical output pulses produced by the embodiment illustrated in FIGURE 3;

FIGURE 3 illustrates another embodiment of a fluid time gate in accordance with this invention; and FIGURE 4 illustrates another embodiment of a fluid time gate constructed in accordance with the instant invention.

Referring now to the accompanying drawings for a more complete understanding of this invention there is shown in FIGURE 1 of the accompanying drawings, a pure fluid time gate 10 comprising a flat plate 11 formed by molding, milling, casting or by other techniques capable of forming the required configuration illustrated in that figure. A flat plate 12 covers the plate 11 and is sealed fluid tight to the latter plate by adhesives, or any other suitable means. For the purpose of clarity, the plate 11 and 12 are illustrated as being composed of a clear plastic material such as Lucite; however, it will be understood that any material compatible with the fluid employed in the time gate 10 may be used for forming the plates.

A pure fluid oscillator 13 is delineated within the lower dotted block in FIGURE 1, the oscillator 13, which is a sonic oscillator, comprises basically a power nozzle 14, a fluid interaction chamber 15, a feedback loop 16, left and right output passages 17 and 18, respectively, and a flow splitter 19.

The left output passage 17 is curved to discharge the fluid flowing therein from the time gate 10 and may be provided with a porous resistive plug 20 for providing impedance matching between the output passage 17 and the output passage 18. Since pure fluid oscillators of the type disclosed either in the aforementioned patent or in the aforementioned patent application have been described briefly hereinabove and are now known to those working in the art, it is deemed sufficient to state that a fluid stream supplied to the power nozzle 14 is repeatedly displaced between the left and right output passages by either alternating shock waves or by oscillating pressures applied across the power stream, the shock waves or pressures issuing from the nozzles of the feedback loop or loops causing a timed succession of fluid pulses to issue from the output passages 17 and 18. FIGURE 2*a* illustrates a wave form of a typical output fluid signal produced by a pure fluid oscillator of either the sonic or of the relaxation type.

The timed pulsed output from the output passage 18 of the oscillator 13 is received by a power nozzle 22 incorporated in a pure fluid logic element 23, shown enclosed within the upper dotted block of FIGURE 1 in the accompanying drawings.

The pure fluid logic element 23 comprises, in addition to the power nozzle 22, an interaction chamber 24, a control nozzle 25, a flow splitter 26, left and right output passages 27 and 28, respectively, and a discharge duct 29. While the pure fluid logic component 23 is shown as an AND logic component, the component 23 may also take the form of an OR-NOR logic component by adding another control nozzle, such as the nozzle 32 illustrated by the dotted lines in FIGURE 1, to discharge a second control input signal into the right side wall 40 of the chamber 24. The control nozzles 25 and 32 receive either pulsating or steady state fluid input signals from the tubes 33 and 34, respectively, the tubes 33 and 34 being threadedly connected to upstream ends of the nozzles 25 and 32, respectively.

FIGURE 2*b* illustrates a typical pulsating fluid input signal which may be received by the logic component 23 from the nozzle 22. Tubes 35 and 36 are similarly threadedly connected to communicate with the downstream ends of the output passages 27 and 28, respectively, and the tubes 35 and 36 may be connected so as to supply fluid to other fluid logic components or to other pure fluid systems to which the tubes are connected for providing input fluid control or operating signals to such fluid components or systems.

The interaction chamber 24 of the component 23 is illustrated as being formed by one half of a class I type amplifier by one half of a class II type amplifier since the chamber side wall 40 is positioned close enough to the orifice of the power nozzle 22 to create boundary layer effects between the power stream issuing from the nozzle 22 and the side wall 40. As a result, the power stream issuing from the power nozzle 22 attaches to the side wall 40 in the absence of a control stream issuing from either the control nozzle 25 or the control nozzle 32. The chamber side wall 41, on the other hand, is set back remotely from the orifice of the power nozzle 22 so that no boundary layer attachment occurs between the power stream issuing from that nozzle and the side wall 41. To further insure that no boundary layer attachments will be created along the wall 41, the width of the discharge duct 29 is made sufficiently large so that enough fluid can be received by the chamber 24 to satisfy the entrainment requirements of the stream flowing against the wall 41. The logic component 23 may be otherwise constructed, as discussed hereinabove, to insure that the power stream issues from a predetermined output passage, and will return to that passage whenever there is an absence of stream displacing control flow to effect component reset.

The jet streams that issue from the control nozzles 25 and 32 will, in the absence of an interacting stream output issuing from the power nozzle 22, flow into the discharge duct 29 and egress from the time gate 10. In the absence of a control jet from either the control nozzle 25 or 32, the power stream issuing from the nozzle 22 will become attached to the side wall 40, enter the output passage 28, and issue from the tube 36 as a binary zero output signal. In the event there is simultaneous interaction between the pulsed input from the power nozzle 22, and either a pulsed or steady state input from the control nozzle 25 or the control nozzle 32, the boundary layer effect created along the side wall 40 will be nullified and the input from the nozzle 22 will be deflected into the output passage 27.

FIGURE 2*c* illustrates a typical output wave form of fluid pulses that may issue from the time gate 10 as a result of stream interaction between the timed pulse output of the oscillator 13 (FIGURE 2*a*) and a pulsed or steady state fluid input signal supplied to the logic component 23 (FIGURE 2*b*). Although the pulsating signals supplied to the control nozzle 25 and/or the control nozzle 32 may not be completely in phase with the pulses issuing from the oscillator 13, the simultaneous interaction occurring between the two pulsating signals acting for the duration of the timed pulse issuing from the nozzle 22 causes a resulting pulsating signal to egress from the left output passage 27 which is in phase with the timed output signal issuing from the oscillator 13. The portions of the input signal supplied to the logic component 23 which cannot interact with the timed pulse signal produced by the oscillator 13 because of the shorter duration of the latter signal, egress from the component 23 through the discharge duct 29. The timed, pulsed output from the oscillator 13 which does not interact with an input signal supplied by either or both of the control nozzles 25 and 32 issues from the right output passage 28. Similarly, a steady state signal supplied to a control nozzle of the logic component 23 will be converted to a pulsed output signal by interaction with the pulsed output issuing from the nozzle 22, the resulting pulse-type signal issuing from the output passage 27. Portions of the steady state signal which cannot interact with the pulsed output from the nozzle 22 because of the shorter duration of the pulsed signal issue from the duct 29 and hence from the timed gate 10.

Since the output tube 35 will receive synchronized fluid pulses whenever the nozzles 22 and 25 issue interacting fluid streams into the interaction chamber 24, the component 23 can be regarded as an AND logic component wherein the output from the tube 35 represents a binary one state of the component and wherein the output from the duct 29 or the tube 36 represents a binary zero state of the component. The component 23 is also designed to change from the zero to the one state if either the control nozzle 25 issues a fluid stream in interacting relationship with the pulsed fluid output from the nozzle 22, or if the control nozzle 32 is also incorporated in the component 23 and issues a fluid stream that interacts with the power stream. Since no interaction will occur and the component 23 will not change state if neither the control nozzle 25 nor the control nozzle 32 issues control fluid input signals, the component 23 may be regarded as an OR-NOR logic component.

Other types of logic components may be substituted for the logic component 23 illustrated in FIGURE 1 in accordance with the logic function desired of the component 23, the AND and OR-NOR component 23 being merely exemplary of a component for providing two kinds of logic functions. For instance, the power nozzle 22 may be connected as the power nozzle for supplying a power stream to any of the pure logic components disclosed in a co-pending application entitled "Fluid components," Serial No. 96,623, filed March 17, 1961 by Billy M. Horton and myself, now Paent No. 3,107,850.

Alternatively, the position of nozzle 22 and the connecting passage 18, and the nozzle 25 and the connecting tube 33 could respectively be interchanged so that the logic signals are supplied into the downstream end of the chamber 24 and the oscillating pulses issue from the sidewall 40 to interact with the logic signals.

FIGURE 3 illustrates an embodiment of the invention wherein the output passage 17 of the oscillator 13 is connected as the power nozzle for another logic component 23′, the logic component 23′ being identical to the logic component 23 described in detail hereinabove. In the absence of a control signal supplied to the nozzle 33′ the pulsating output from the passage 17 will issue from the passage 27′, and in the event a fluid signal is supplied to the nozzle 33′, a pulsating fluid signal will issue from the passage 28′. The signals issuing from the passage 28′ will be positive pressure signals which are out of phase with the positive pressure signals issuing from the component 23.

With reference to FIGURE 2*d*, numeral 45 designates typical pressure output signals produced by the component 23, whereas numeral 46 designates the out-of-phase output pressure signals which typically issue from the component 23′.

The resulting system provides a double time gate and the positive pressure signals issuing from the component 23′ may be employed to drive or control other fluid units. For example, if a signal is applied to the nozzle 33′ for the purpose of resetting another pure fluid logic component staged to the component 23, one of the nozzles of the other logic component could be coupled to the output passage 28 and the component could then be reset by a positive pressure pulse issuing from the passage 28' of the component 23'. The other logic component would therefore be reset and ready to receive the next positive pressure pulse issuing from the passage 28 of the component 23.

FIGURE 4 of the accompanying drawings illustrates another embodiment of this invention wherein a pure fluid bistable component or flip-flop indicated generally by the numeral 48, is coupled between the output passages 17 and 18 of the pure fluid oscillator 13 and the pure fluid logic components 23 and 23', respectively. The cavities and passages required to form the oscillator 13 and the flip-flop 48 are provided in the plate 11, the plate 11 being covered by the plate 12 and sealed thereto in accordance with conventional techniques. When the pressures in the output passages of the pure fluid components are varied in a pure fluid time gate such as shown in the embodiments of FIGURE 1 or FIGURE 3, the frequency of the driving oscillator may be caused to vary as a result. For example, as the backloading of the pure fluid logic component increases the pressure in the output passage or passages of the pure fluid oscillator which is directly connected to the pure fluid component increases causing the stability of the oscillator to decrease and the sensitivity to increase. The frequency of the oscillator tends to increase as the stability decreases and as the sensitivity increases, and vice versa.

In order to maintain a constant frequency output from the oscillator, the pure fluid buffer amplifier 48 is coupled between the oscillator 13 and the fluid logic components 23 and 23', the purpose of the buffer amplifier 48 being to prevent the feedback of the variable pressure and flows from the logic components directly to the output passages of the oscillator 13.

As illustrated in FIGURE 4, the output passages 17 and 18 of the oscillator 13 are connected to control nozzles 50 and 51, respectively, of the buffer amplifier 48. A power nozzle 52 receives fluid from a tube or pipe 53 which is threadedly connected to the flat plate 12, the pipe 53 supplying fluid to the power nozzle 52. An interaction chamber 54 is provided which may be either a class I or class II type of interaction chamber, the chamber 54 being illustrated as a class II type of interaction chamber. Output passages 55 and 56 are connected by tubes 57 and 58, respectively, to the power nozzles 22' and 22 respectively, of the pure fluid logic components 23' and 23, respectively. The operation of the pure fluid oscillator 13 and the pure fluid logic components 23 and 23' has been discussed in detail hereinabove.

The buffer amplifier 48 is basically a pure fluid flip-flop that issues a succession of fluid pulses such as shown in FIGURE 2*d* of the accompanying drawings as a result of alternating fluid streams issuing from the control nozzles 50 and 51 interacting with the power stream issuing from the power nozzle 52. Since the amplifier 48 is driven by the oscillator 13 the frequency of oscillation of the amplifier 48 is identical to that of the oscillator 13. Any increased pressures or flows caused by backloading the output passages of the logic components 27 or 28 are received in the interaction chamber 54 of the amplifier 48 and are not fed back through the passages 17 and 18 to the oscillator 13. Hence the oscillator 13 is capable of operating at a constant frequency regardless of the backloading conditions of the output passages 27 and 28 or of the output passages 27' and 28' of the logic components 23 and 23', respectively.

While I have described and illustrated several specific embodiments of my invention, it will be clear that variations of the details of construction which are specifically illustrated and described may be resorted to without departing from the true spirit and scope of the invention as defined in the appended claims.

What is claimed is:

1. A pure fluid timed gate comprising a pure fluid oscillator for producing substantially constant successive fluid pulses, a pure fluid logic component coupled to the output of said oscillator for receiving the fluid pulses therefrom, said logic component receiving input signals that interact with the pulsed output of said oscillator so that the output of said logic component is phased to that of said oscillator.

2. The pure fluid timed gate as claimed in claim 1 wherein said pure fluid logic component comprises an AND logic component.

3. The pure fluid timed gate as claimed in claim 1, wherein said pure fluid logic component comprises an OR type logic component.

4. A fluid operated component for gating fluid input signals received by said component, said component comprising an interaction chamber for receiving and confining fluid supplied thereto, pure fluid amplifier means for generating and issuing a timed pulse type fluid signal into one end of said chamber, means for issuing a fluid input signal into said interaction chamber in interacting relationship with said pulse type fluid signal, and at least one passage located downstream of said chamber for receiving the timed ouput pulse produced by the interaction betwen the two input signals.

5. A fluid system for synchronizing a first fluid stream to a second fluid stream, the first fluid stream being a timed, pulsed fluid stream, said system comprising, means for issuing the first and second signals in interacting relationship, means for receiving the resultant, synchronized pulse type fluid stream, pure fluid amplifier means for generating the first fluid stream, and means for receiving unsynchronized portions of the first and second streams.

6. A fluid operated system comprising an interaction chamber for receiving and confining fluid streams supplied thereto, pure fluid amplifier means for generating a succession of substantially constant time fluid pulses, means for receiving and applying the fluid pulses into one end of said interaction chamber, and means for issuing a fluid stream into said interaction chamber in interacting relationship with said fluid pulses and means located downstream of said interaction chamber for receiving resultant synchronized pulsed output produced by the interaction between the stream and the fluid pulses in said interaction chamber.

7. A fluid operated system as claimed in claim 6, wherein said means for generating a succession of substantially constant time fluid pulses comprises a pure fluid oscillator.

8. A fluid operated system as claimed in claim 6 wherein means communicating with said interaction chamber are provided for receiving portions of the fluid stream that are out of phase with the timed fluid pulses.

9. A fluid operated system as claimed in claim 6, wherein means communicating with said interaction chamber are provided for receiving the timed fluid pulses which do not interact with the fluid stream.

10. A pure fluid operated system comprising pure fluid means for producing timed fluid signals, a pure fluid logic component including an interaction chamber for receiving the timed signals, means for supplying a second fluid input signal into said interaction chamber in interacting relationship with the time signal, means for receiving the resultant synchronized fluid pulse type output signal, and means for receiving non-interacting fluid signals supplied to said interaction chamber.

11. In combination, a pure fluid oscillator for producing a succession of substantially constant fluid output signals, a pure fluid bistable component coupled to the output of said fluid oscillator for receiving the output signals therefrom and for producing a corresponding succession of substantially constant fluid output signals, and at least one pure fluid logic component coupled to the output of said bistable component for receiving the succession of substantially constant fluid output signals therefrom, said logic component receiving input signals that interact with the pulsed output of said bistable component so that the output of said logic component is phased to that of said bisable component.

12. The combination as claimed in claim 11 wherein said bistable component comprises a pure fluid flip-flop.

References Cited by the Examiner

UNITED STATES PATENTS

| | | | |
|---|---|---|---|
| 2,889,856 | 6/59 | Magnuson | 137—83 |
| 3,001,698 | 9/61 | Warren | 235—61 |
| 3,016,066 | 1/62 | Warren | 235—61 |
| 3,093,306 | 6/63 | Warren | 235—61 |
| 3,107,850 | 10/63 | Warren et al. | 235—61 |
| 3,117,593 | 1/64 | Sowers | 235—61 |
| 3,119,413 | 1/64 | Waldo | 137—251 |
| 3,122,062 | 2/64 | Spivak | 137—81.5 |
| 3,122,165 | 2/64 | Horton | 137—608 |

OTHER REFERENCES

Stong, C. L.: The Amateur Scientist, Scientific American, vol. 207, No. 2, August 1962.

LEO SMILOW, *Primary Examiner.*

LEYLAND M. MARTIN, *Examiner.*